US008836976B2

(12) United States Patent
Tezuka

(10) Patent No.: US 8,836,976 B2
(45) Date of Patent: Sep. 16, 2014

(54) IMAGE TRANSMISSION APPARATUS, IMAGE TRANSMISSION SYSTEM, AND NON-TRANSITORY COMPUTER READABLE MEDIUM, AND IMAGE TRANSMISSION METHOD

(75) Inventor: Yoshiaki Tezuka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 285 days.

(21) Appl. No.: 13/292,529

(22) Filed: Nov. 9, 2011

(65) Prior Publication Data

US 2012/0307290 A1 Dec. 6, 2012

(30) Foreign Application Priority Data

May 30, 2011 (JP) ................................. 2011-120982

(51) Int. Cl.
*G06F 3/12* (2006.01)
*G06K 15/00* (2006.01)
*H04N 1/00* (2006.01)
*H04M 11/00* (2006.01)

(52) U.S. Cl.
CPC ......... *H04N 1/0022* (2013.01); *H04N 1/00925* (2013.01); *H04N 2201/0093* (2013.01); *H04N 2201/0039* (2013.01); *H04N 1/00915* (2013.01); *H04N 1/0048* (2013.01); *H04N 2201/0094* (2013.01)
USPC ......... 358/1.15; 358/1.14; 358/407; 358/437; 379/100.15

(58) Field of Classification Search
None
See application file for complete search history.

(56) References Cited

U.S. PATENT DOCUMENTS 6,323,962 B1 * 11/2001 Itoh et al. ...................... 358/468
6,473,816 B1 * 10/2002 Yoshida et al. ............... 710/113
6,496,283 B1 * 12/2002 Kabeya ......................... 358/468

FOREIGN PATENT DOCUMENTS

| JP | A-2003-333269 | 6/2003 |
| JP | A-2003-283742 | 10/2003 |
| JP | A-2003-333269 | 11/2003 |
| JP | A-2004-104169 | 4/2004 |

* cited by examiner

*Primary Examiner* — Thomas Lett
(74) *Attorney, Agent, or Firm* — Oliff PLC

(57) ABSTRACT

An image transmission apparatus includes an acquisition unit that acquires image data and an identifier for identifying a transmission destination, a first transmission unit that transmits the image data to a transmission destination identified by the identifier, a receiving unit that receives a stop instruction for stopping the transmission while the first transmission unit is transmitting the image data, and a processing unit that when a transmission request of the image data is received from a host apparatus, performs stop processing for stopping the transmission when the receiving unit receives the stop instruction and performs stop prevention processing for preventing the stop processing from being performed or the stop instruction from being received when the transmission request of the image data is received from an external apparatus.

21 Claims, 20 Drawing Sheets

| RECEIVING NUMBER | SOURCE OF DATA ACQUISITION | TRANSMISSION DESTINATION | WHETHER OR NOT TO STOP TRANSMISSION |
|---|---|---|---|
| 1 | EXTERNAL APPARATUS | XXX-XXXX | STOPPABLE |
| 2 | HOST DEVICE | YYY-YYYY | — |
| 3 | EXTERNAL APPARATUS | ZZZ-ZZZZ | UNSTOPPABLE |
| ⋮ | ⋮ | ⋮ | ⋮ |

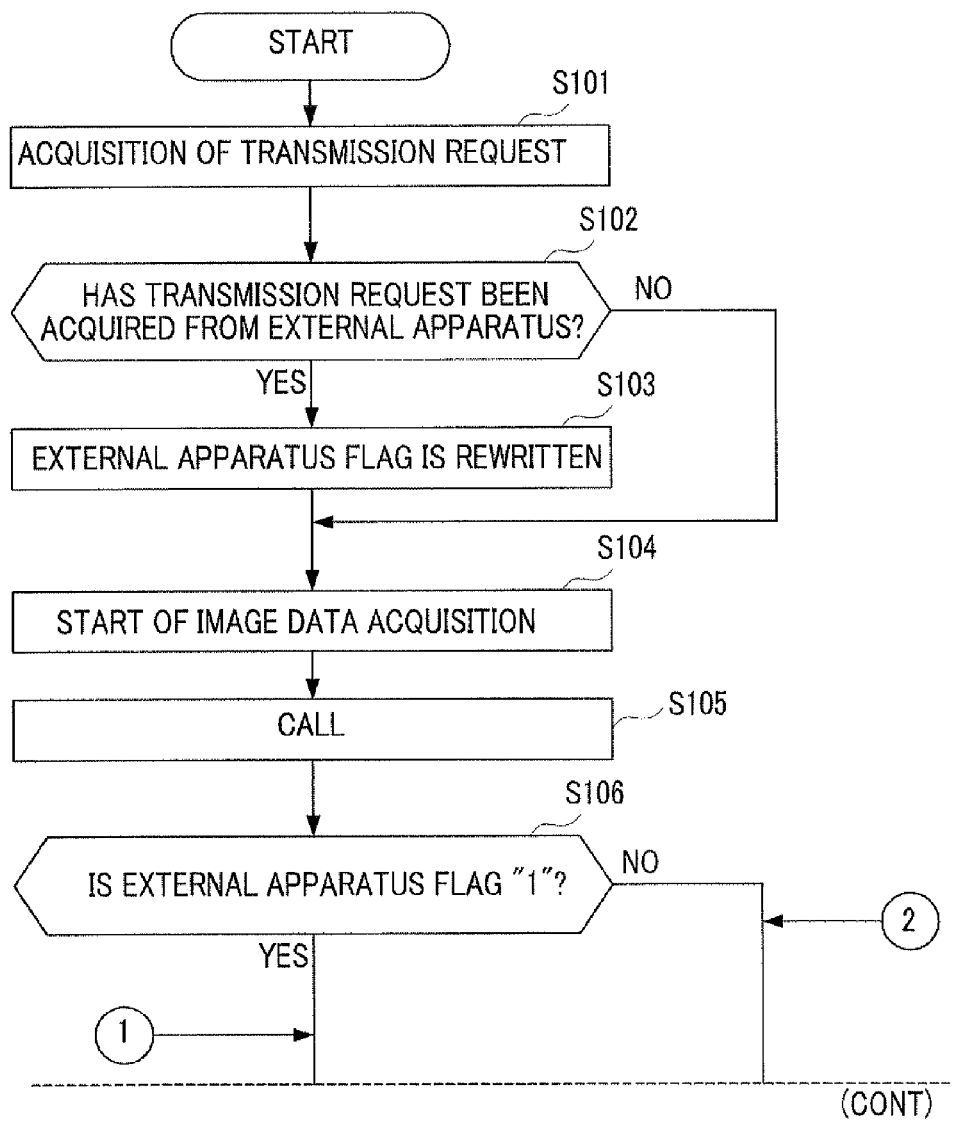

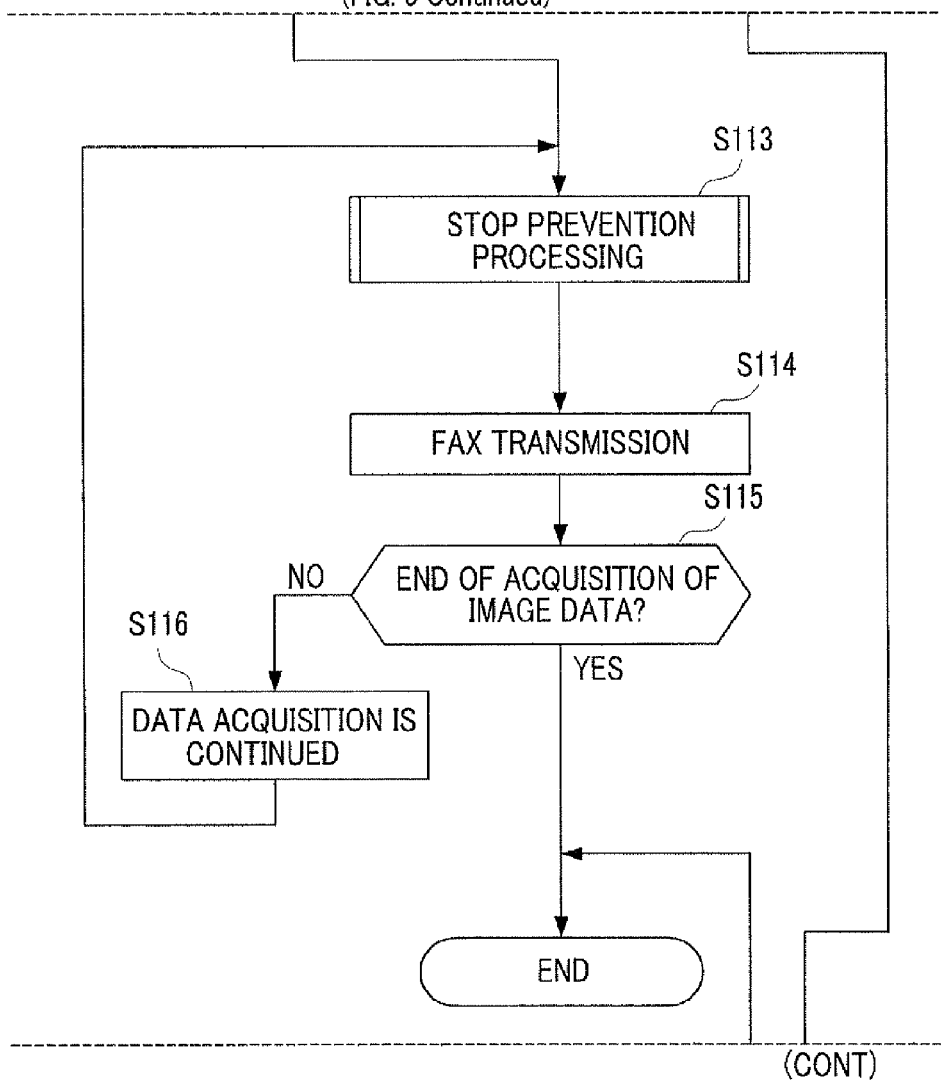

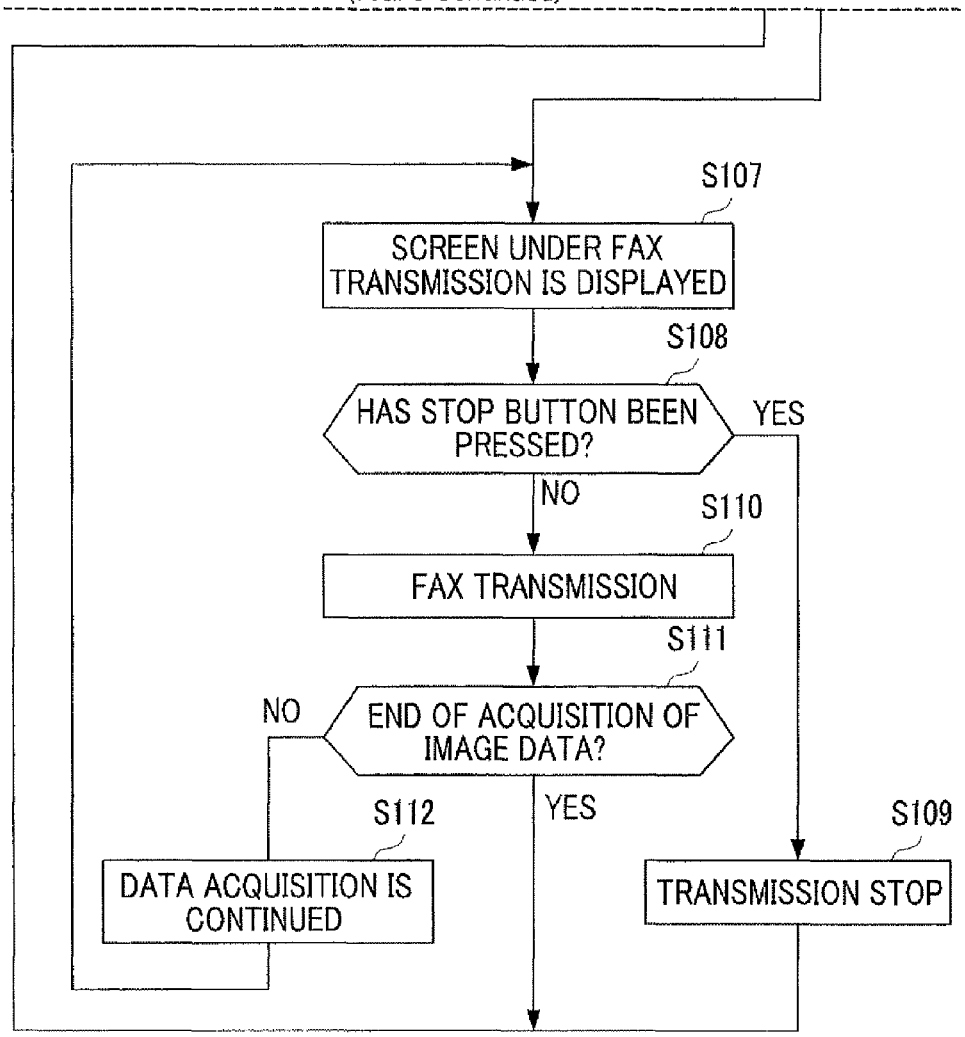

FIG. 8

| RECEIVING NUMBER | SOURCE OF DATA ACQUISITION | TRANSMISSION DESTINATION | WHETHER OR NOT TO STOP TRANSMISSION |
|---|---|---|---|
| 1 | EXTERNAL APPARATUS | XXX-XXXX | STOPPABLE |
| 2 | HOST DEVICE | YYY-YYYY | — |
| 3 | EXTERNAL APPARATUS | ZZZ-ZZZZ | UNSTOPPABLE |
| ⋮ | ⋮ | ⋮ | ⋮ |

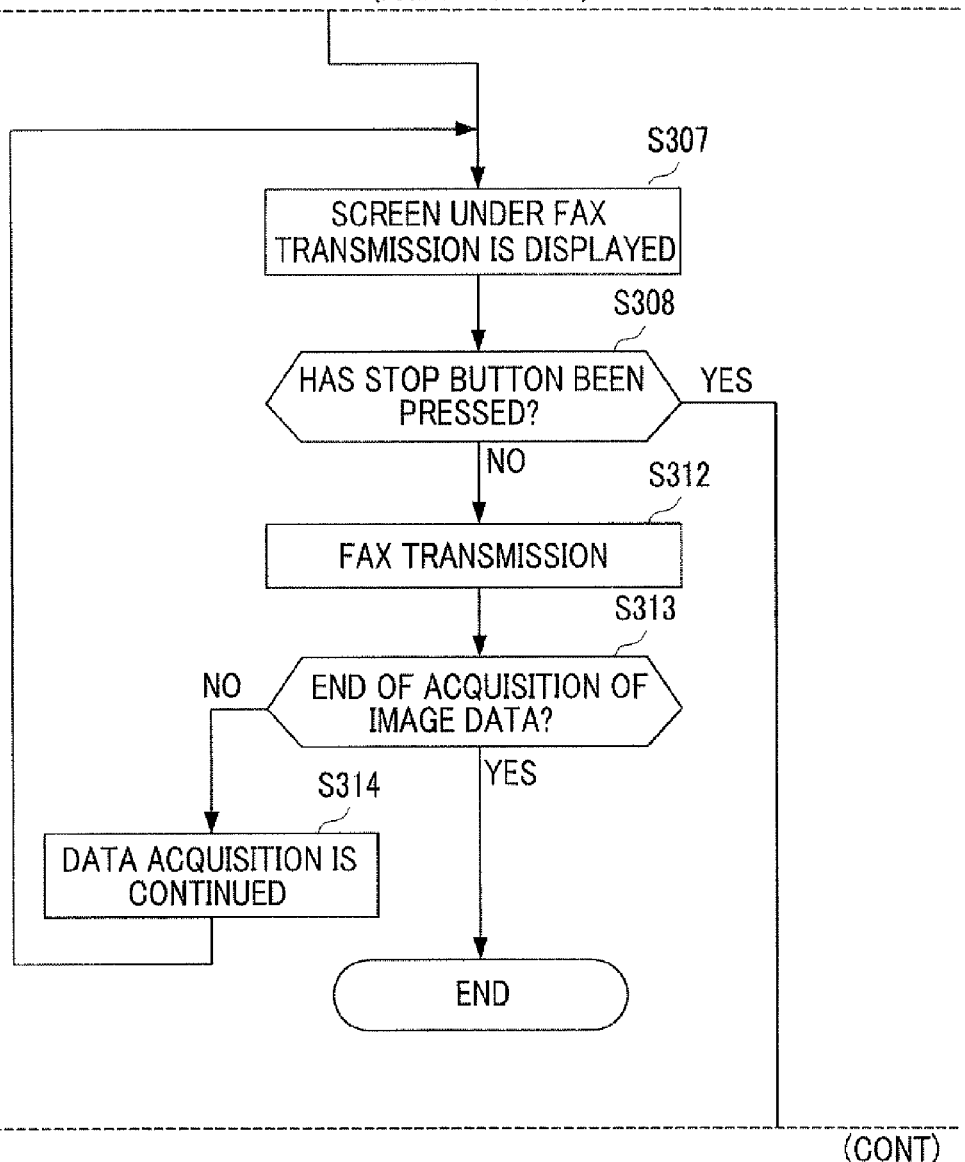

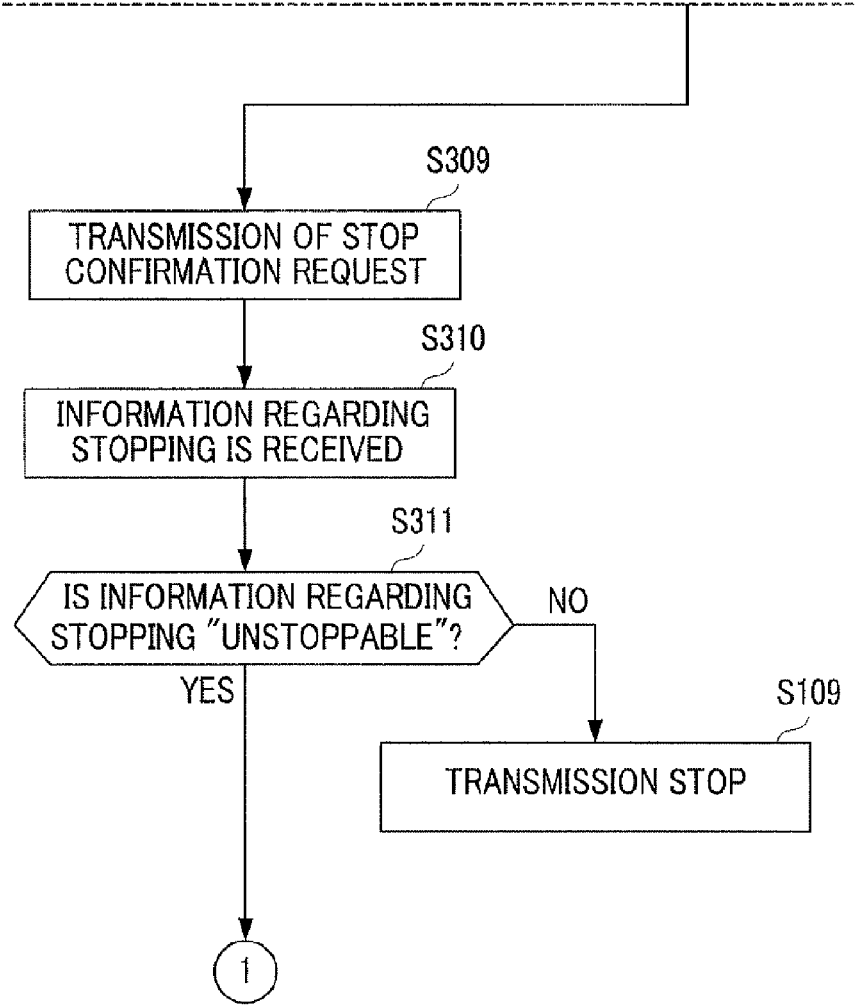

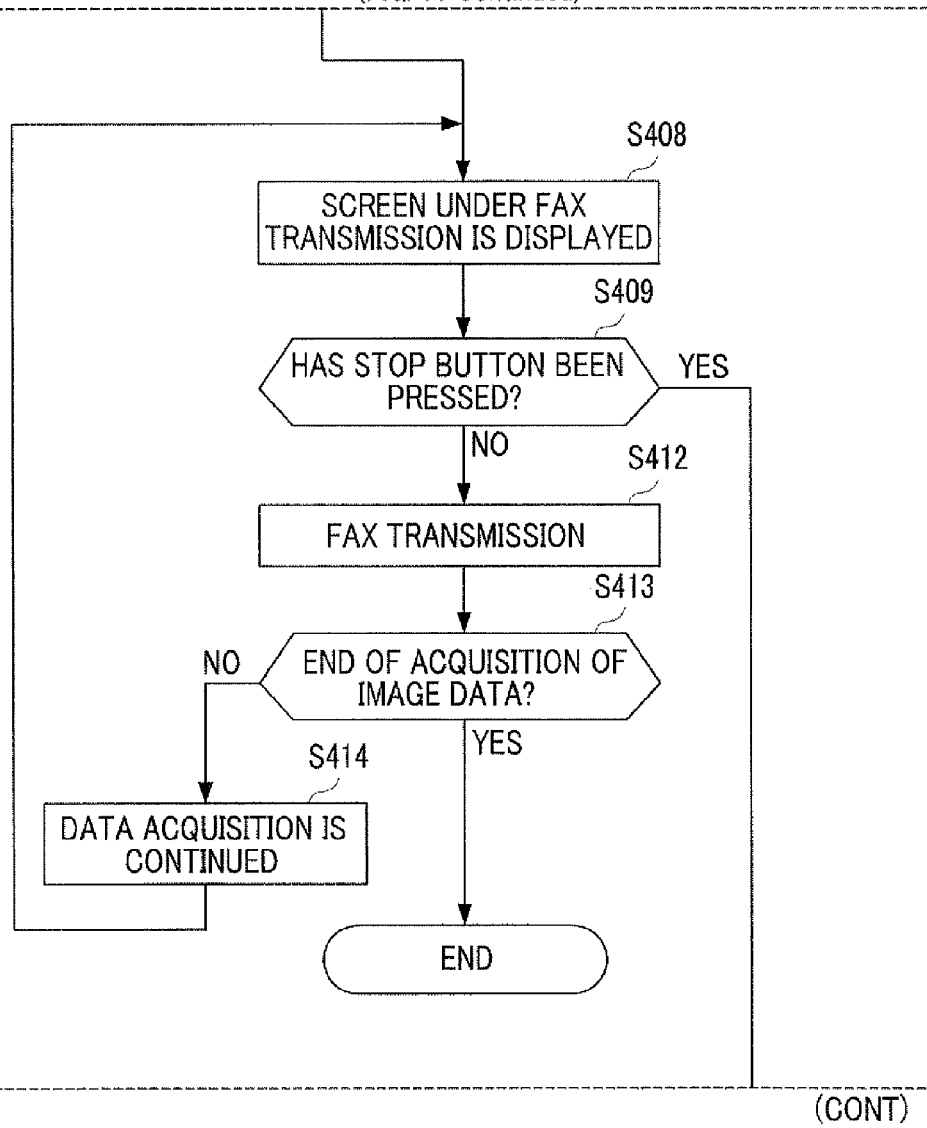

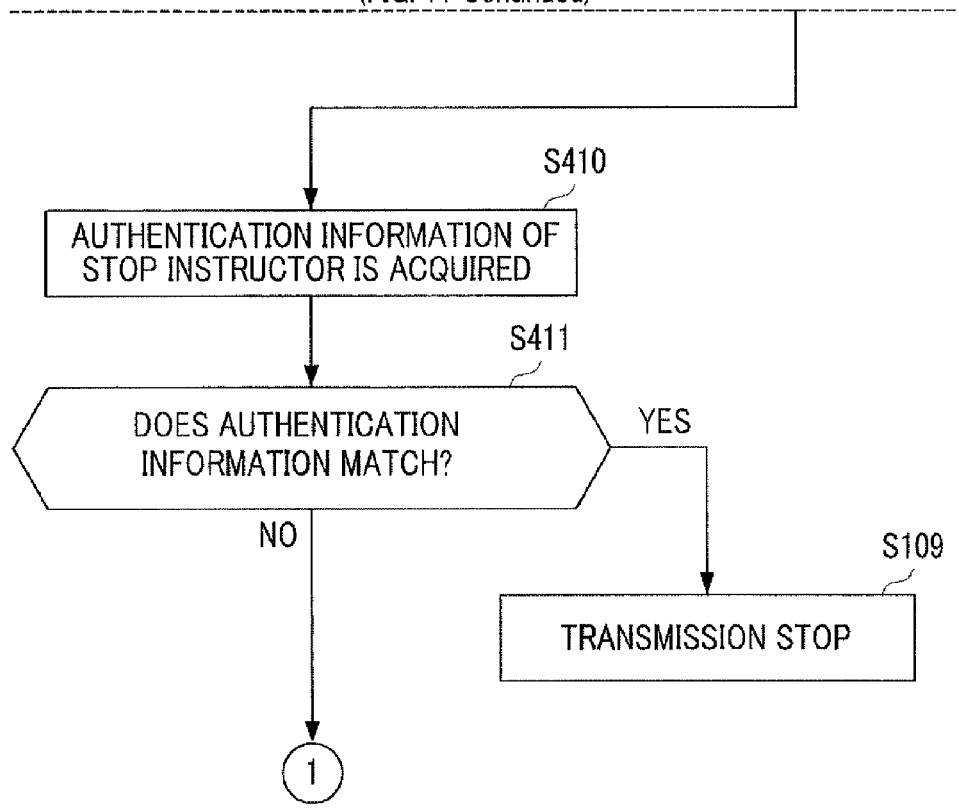

FIG. 12

| RECEIVING NUMBER | SOURCE OF DATA ACQUISITION | NUMBER OF TRANSMISSION DESTINATION | AUTHENTICATION INFORMATION |
|---|---|---|---|
| 1 | EXTERNAL APPARATUS | XXX-XXXX | ○○○ |
| 2 | HOST DEVICE | YYY-YYYY | — |
| 3 | EXTERNAL APPARATUS | ZZZ-ZZZZ | △△△ |
| ⋮ | ⋮ | ⋮ | ⋮ |

FIG. 13

| DEPARTMENT | STOP PREVENTION SETTING |
|---|---|
| GENERAL AFFAIRS | POSSIBLE |
| LEGAL | NOT POSSIBLE |
| ACCOUNTING | POSSIBLE |
| ⋮ | ⋮ |

IMAGE TRANSMISSION APPARATUS, IMAGE TRANSMISSION SYSTEM, AND NON-TRANSITORY COMPUTER READABLE MEDIUM, AND IMAGE TRANSMISSION METHOD

CROSS-REFERENCE TO RELATED APPLICATIONS

This application is based on and claims priority under 35 USC 119 from Japanese Patent Application No. 2011-120982 filed May 30, 2011.

BACKGROUND (i) Technical Field

The present invention relates to an image transmission apparatus, an image transmission system, a non-transitory computer readable medium, and an image transmission method.

(ii) Related Art

A technique of performing facsimile transmission through communication of an apparatus, which does not have a facsimile transmission function, with a facsimile transmitter is known.

SUMMARY

According to an aspect of the invention, there is provided an image transmission apparatus including: an acquisition unit that acquires image data and an identifier for identifying a transmission destination; a first transmission unit that transmits the image data to a transmission destination identified by the identifier; a receiving unit that receives a stop instruction for stopping the transmission while the first transmission unit is transmitting the image data; and a processing unit that when a transmission request of the image data is received from a host apparatus, performs stop processing for stopping the transmission when the receiving unit receives the stop instruction and performs stop prevention processing for preventing the stop processing from being performed or the stop instruction from being received when the transmission request of the image data is received from an external apparatus.

BRIEF DESCRIPTION OF THE DRAWINGS

Exemplary embodiments of the present invention will be described in detail based on the following figures, wherein:

FIG. 5 is a flow chart showing processing according to a first exemplary embodiment;

FIG. 8 is a view showing an example of data indicating the information regarding the stopping;

FIG. 12 is a view showing an example of data showing a transmission destination number and authentication information; and FIG. 13 is a view showing an example of setup information of stop prevention processing.

DETAILED DESCRIPTION

Figure 1:
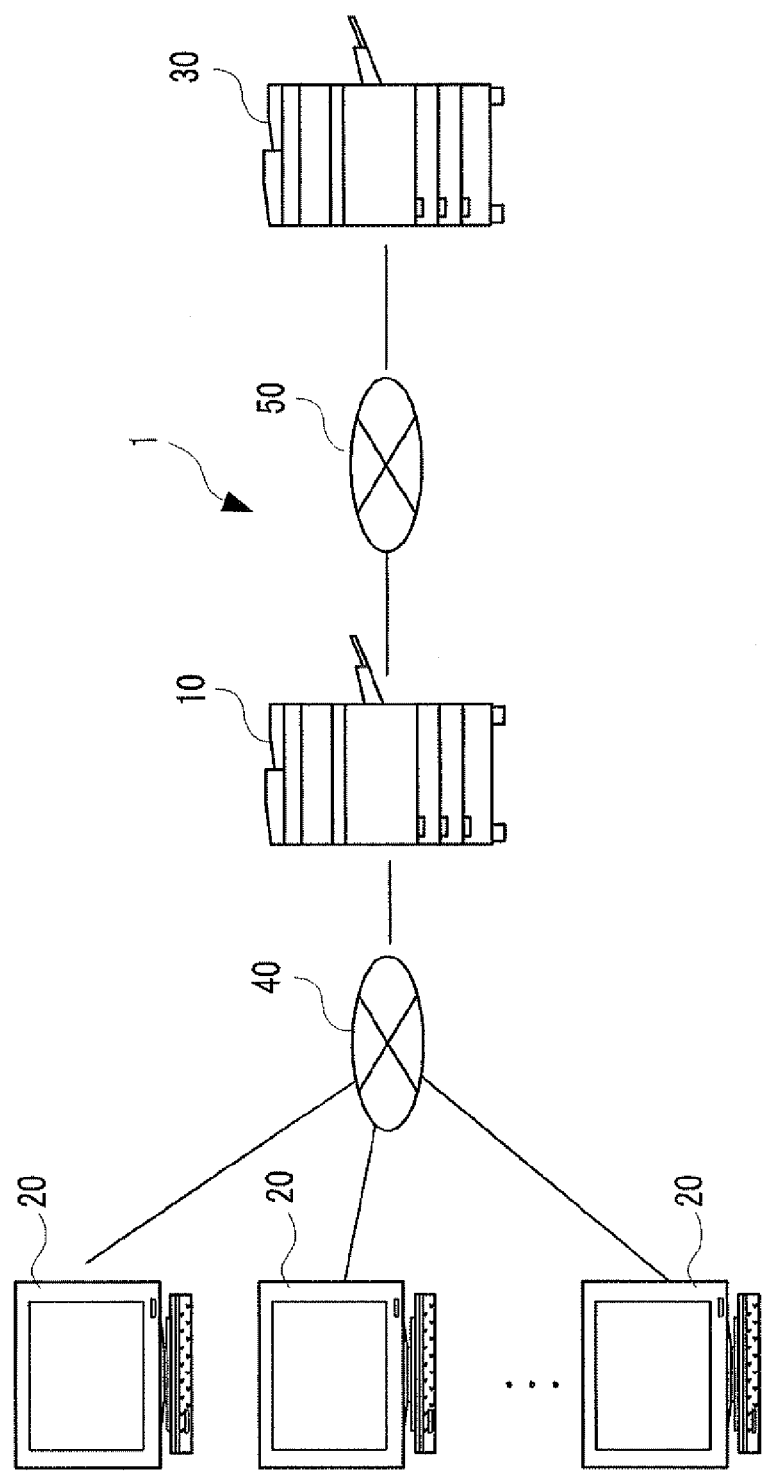
FIG. 1 is a view showing the entire configuration of an image transmission system.

FIG. 1 is a view showing the entire configuration of an image transmission system 1 according to an exemplary embodiment of the invention. The image transmission system 1 includes an image forming apparatus 10, a terminal apparatus 20, and an image forming apparatus 30. The terminal apparatus 20 is an information terminal, such as a personal computer. The image forming apparatuses 10 and 30 are apparatuses functioning as a copying machine, a printer, a scanner, a facsimile, and the like. The terminal apparatus 20 is connected to the image forming apparatus 10 through an internal communication line 40. The internal communication line 40 is a cable or wireless LAN (Local Area Network). The image forming apparatus 10 is connected to the image forming apparatus 30 through an external communication line 50, such as a telephone line. In the above configuration, the image forming apparatus 10 performs facsimile transmission of the image data, which is read by its own scanner, or image data, which is transmitted from the terminal apparatus 20, to the image forming apparatus 30.

Figure 2:
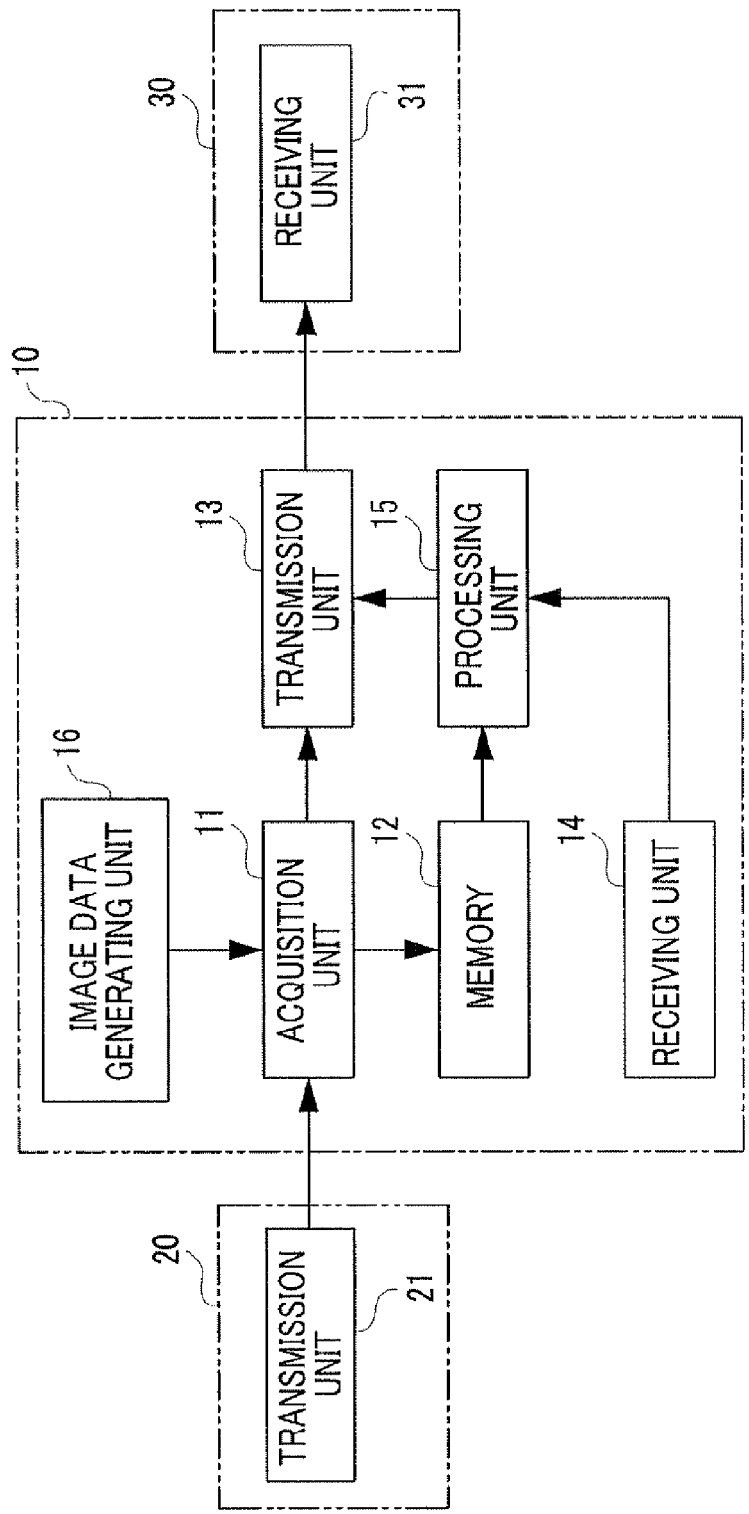
FIG. 2 is a block diagram showing the functional configuration of an image transmission system.

FIG. 2 is a block diagram showing the functional configuration of the image transmission system 1. The image forming apparatus 10 includes an acquisition unit 11, a memory 12, a transmission unit 13, a receiving unit 14, a processing unit 15, and an image data generating unit 16. The acquisition unit 11 (an example of acquisition means) acquires a transmission destination number (identifier for identifying a transmission destination) and image data. The memory 12 (an example of storage means) stores a flag indicating whether or not the image data acquired by the acquisition unit 11 has been acquired from an external apparatus. The transmission unit 13 (an example of transmission means) transmits the image data to the transmission destination identified by the transmission destination number. The receiving unit 14 (an example of receiving means) receives a stop instruction to stop the transmission while the transmission unit 13 is transmitting the image data. The processing unit 15 (an example of processing unit) performs stop processing for stopping the transmission when the stop instruction is received by the receiving unit 14 if the flag indicates that the image data transmitted by the transmission unit 13 has not been acquired from the terminal apparatus 20. In addition, if the flag indicates that the image data transmitted by the transmission unit 13 has been acquired from the terminal apparatus 20, the processing unit 15 performs stop prevention processing for preventing stop processing. The image data generating unit 16 (an example of image data generation means) reads a document to generate image data.

The terminal apparatus 20 includes a transmission unit 21. The transmission unit 21 (an example of transmission means) transmits a transmission destination number and image data to the image forming apparatus 10. The image forming apparatus 30 includes a receiving unit 31. The receiving unit 31 (an example of a receiving means) receives the image data transmitted by the image forming apparatus 10.

Figure 3:
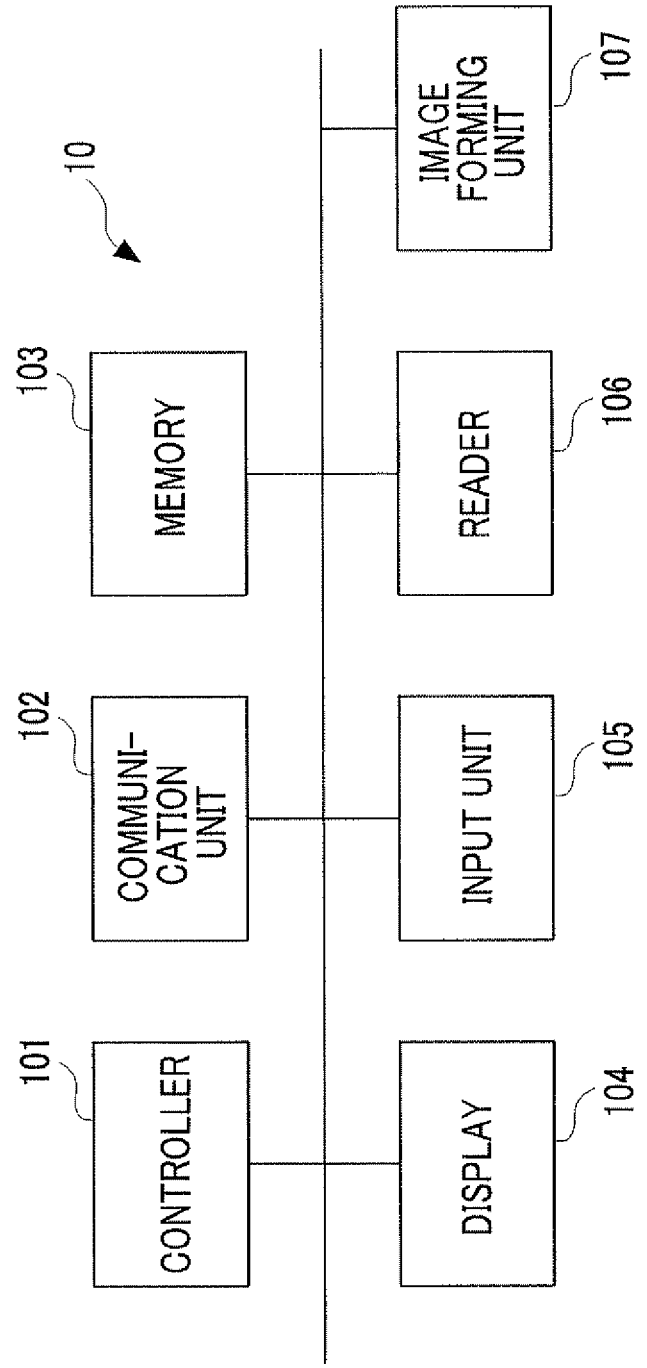
FIG. 3 is a block diagram showing the hardware configuration of an image forming apparatus.

FIG. 3 is a block diagram showing the hardware configuration of the image forming apparatus 10. The image forming apparatus 10 is a computer including a controller 101, a communication unit 102, a memory 103, a display 104, an input unit 105, a reader 106, and an image forming unit 107. The controller 101 (an example of control means) controls the operation of each unit of the image forming apparatus 10. The controller 101 includes a CPU (Central Processing Unit), a ROM (Read Only Memory), and a RAM (Random Access Memory). The communication unit 102 (an example of communication means) performs communication through the internal communication line 40 and the external communication line 50. The memory 103 is a storage device that stores data and a program, for example, an HDD (Hard Disk Drive). The memory 103 stores data and a program used by the controller 101. The display 104 includes a display device, such as a liquid crystal display or an organic EL (Electroluminescence) display, and displays a menu screen or various messages for operating the image forming apparatus 10. The input unit 105 (an example of receiving means) includes various keys for inputting data or an instruction to the image forming apparatus 10 and a touch screen (touch panel) provided so as to overlap the display 104. Various kinds of instructions or settings are made for the image forming apparatus 10 when a user operates the input unit 105. The reader 106 is an image scanner that reads a document optically and outputs the read document as image data. The image forming unit 107 forms an image using an electrophotographic method or an ink jet method. The image forming apparatus 30 has the same hardware configuration as the image forming apparatus 10.

In the image forming apparatus 10, the controller 101 that executes a program is an example of the acquisition unit 11 and the processing unit 15. The communication unit 102 controlled by the controller 101 that executes a program is an example of the transmission unit 13. The display 104 and the input unit 105 controlled by the controller 101 that executes a program are an example of the receiving unit 14. The reader 106 controlled by the controller 101 that executes a program is an example of the image data generating unit 16. Moreover, in the image forming apparatus 30, the communication unit 102 controlled by the controller 101 that executes a program is an example of the receiving unit 31.

Figure 4:
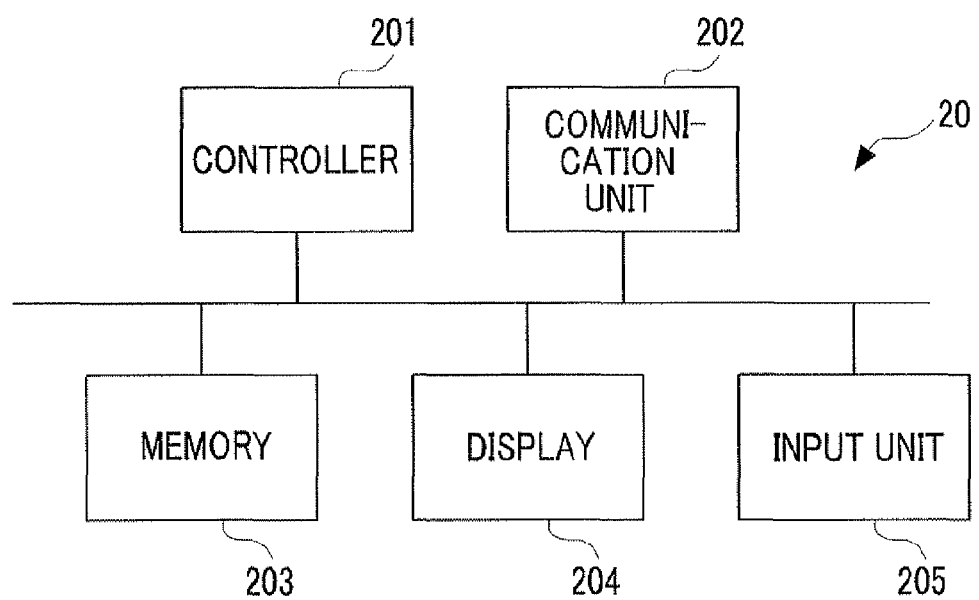
FIG. 4 is a block diagram showing the hardware configuration of a terminal apparatus.

FIG. 4 is a block diagram showing the hardware configuration of the terminal apparatus 20. The terminal apparatus 20 is a computer including a controller 201, a communication unit 202, a memory 203, a display 204, and an input unit 205. The controller 201 controls the operation of each unit of the terminal apparatus 20. The controller 201 includes a CPU, a ROM, and a RAM. The communication unit 202 performs communication through the internal communication line 40. The memory 203 is a storage device that stores data and a program, for example, an HDD. The memory 203 stores data and a program used by the controller 201. The display 204 includes a display device, such as a liquid crystal display or an organic EL display. The input unit 205 is a device that receives an input from a user and includes a keypad (keyboard) or various kinds of buttons. The communication unit 202 controlled by the controller 201 that executes a program is an example of the transmission unit 21.

First Exemplary Embodiment

FIG. 5 is a flow chart showing the processing according to a first exemplary embodiment of the invention which is executed in the image forming apparatus 10. In the image transmission system 1, two methods are mainly used to perform facsimile transmission from the image forming apparatus 10 to the image forming apparatus 30. One method is that a user operates the image forming apparatus 10 directly. In this case, a user places a document on the reading position of the reader 106. In addition, the user operates the input unit 105 to input an instruction for facsimile transmission. This instruction includes information for identification of the transmission destination, for example, a facsimile number of the image forming apparatus 30. When this instruction is input, the reader 106 reads the document, and the communication unit 102 transmits the image data of the document to the image forming apparatus 30. Another method is to transmit an instruction for facsimile transmission from the terminal apparatus 20 to the image forming apparatus 10. In this case, the user operates the input unit 205 to input an instruction for facsimile transmission of the document from the image forming apparatus 10. In response to this instruction, the terminal apparatus 20 controls the image forming apparatus 10 to perform facsimile transmission. The image forming apparatus 10 transmits the image data of the document to the image forming apparatus 30 according to the instruction and the data transmitted from the terminal apparatus 20.

The following situation is considered in the image transmission system 1. A certain user A inputs from the terminal apparatus 20 an instruction to perform facsimile transmission. The image forming apparatus 10 is transmitting the image data to the image forming apparatus 30 in response to this instruction. Another user B operates the image forming apparatus 10 directly for facsimile transmission of his or her document. In this situation, a case is considered in which the user B operates the image forming apparatus 10 to accidentally instruct stopping of facsimile transmission (facsimile transmission of the document of the user A), which is being executed currently, and the image forming apparatus stops the facsimile transmission in response to the instruction. In this case, from the standpoint of the user A, the facsimile transmission instructed by himself or herself is stopped regardless of his or her intention. The image transmission system 1 is a system that suppresses stopping of facsimile transmission irrelevant to a user's intention. The flow shown in FIG. 5 starts when the controller 101 receives an instruction for facsimile transmission. The instruction for facsimile transmission is input directly from the image forming apparatus 10 or input from the terminal apparatus 20.

In step S101, the controller 101 acquires a transmission request. When facsimile transmission is directly performed from the image forming apparatus 10, the controller 101 acquires a transmission request from the input unit 105. On the other hand, when an instruction for facsimile transmission is given from the terminal apparatus 20, the controller 101 receives a transmission request from the communication unit 102. Information indicating the instruction of facsimile transmission and the transmission destination number are included in the transmission request. In step S102, the controller 101 determines whether or not the transmission request has been acquired from an external apparatus. The external apparatus means an apparatus other than the image forming apparatus 10. The controller 101 determines that the transmission request has been acquired from an external apparatus when the transmission request is received from the communication unit 102. The controller 101 determines that the transmission request has not been acquired from an external apparatus (transmission request has been acquired from the host apparatus) when the transmission request is acquired from the input unit 105. When it is determined that the transmission request has been acquired from the external apparatus (step S102: YES), the controller 101 proceeds to step S103. When it is determined that the transmission request has not been acquired from the external apparatus (step S102: NO), the controller 101 proceeds to step S104.

In step S103, the controller 101 rewrites an external apparatus flag. The external apparatus flag is data indicating the determination result in step S102, and is stored in the RAM of the controller 101. The initial value of the external apparatus flag is "0". In step S103, the controller 101 rewrites the value of the external apparatus flag to "1". In the external apparatus flag, indicates that a transmission request has been acquired from the terminal apparatus 20, and "0" indicates that a transmission request has been acquired from the image forming apparatus 10 itself. The information of the external apparatus flag is stored while the acquisition or facsimile transmission of the image data is being performed.

In step S104, the controller 101 starts the acquisition of the image data. When facsimile transmission is directly performed from the image forming apparatus 10, the controller 101 acquires the image data from the reader 106. On the other hand, when an instruction for facsimile transmission is given from the terminal apparatus 20, the controller 101 receives the image data from the communication unit 102. In step S105, the communication unit 102 calls the transmission destination number included in the acquired transmission request for connection with the image forming apparatus 30. In a state where the connection with the image forming apparatus 30 is established, the image forming apparatus 10 performs facsimile transmission of the image data. In addition, the calling may be performed before the acquisition of the image data starts. In step S106, the controller 101 determines whether or not the value of the external apparatus flag is "1". When it is determined that the value of the external apparatus flag is not "1" (step S106: NO), the controller 101 proceeds to step S107. When it is determined that the value of the external apparatus flag is "1" (step S106: YES), the controller 101 proceeds to step S113.

In step S107, the display 104 displays a screen showing that facsimile transmission is being performed (hereinafter, referred to as a "screen under FAX transmission").

Figure 6A:
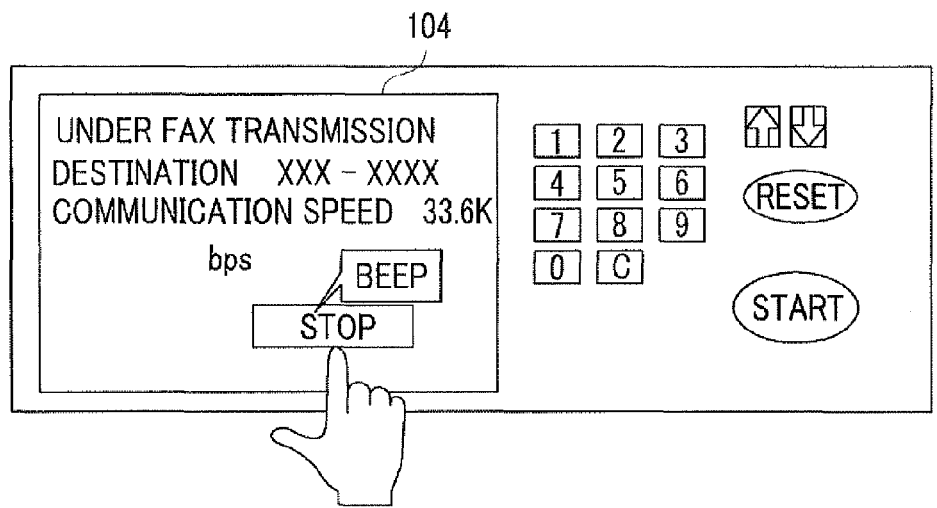
FIGS. 6A to 6D are views illustrating a screen displayed on a display.

FIGS. 6A to 6D are views illustrating a screen displayed on the display 104. In this example, the image forming apparatus 10 includes a touch panel (touch screen). In this touch panel, the display 104 functions as a display device, and the input unit 105 functions as a position input device. FIG. 6A is an example of the screen under FAX transmission. The screen under FAX transmission refers to a screen including a character string or an image showing facsimile transmission is being performed. In this example, the screen under FAX transmission includes not only the information, such as the transmission destination number, but also a stop button for stopping facsimile transmission. Hereinafter, the "position equivalent to a stop button is touched in a touch panel" is referred to as a "stop button is pressed".

FIG. 5 is referred to again. In step S108, the controller 101 determines whether or not the stop button has been pressed. When the stop button has been pressed (step S108: YES), the controller 101 performs facsimile transmission stop processing in step S109. The facsimile transmission stop processing refers to ending the processing of facsimile transmission in response to a stop instruction irrespective of whether or not the transmission of all image data, which is to be transmitted, has been completed. When the stop button has not been pressed (step S108: NO), the controller 101 continues facsimile transmission in step S110. The stop button continues to be displayed while the facsimile transmission is being performed. Accordingly, a user may press the stop button any time in this period.

In step S111, the controller 101 determines whether or not the acquisition of the image data has ended. If there is no next document to be read in the reader 106 when the image data is acquired from the reader 106, the controller 101 determines that the acquisition of the image data has ended. When the acquisition of the image data has ended (step S111: YES), the controller 101 ends the facsimile transmission. When the acquisition of the image data has not ended (step S111: NO), the controller 101 continues the acquisition of the image data in step S112.

In step S113, the controller 101 performs stop prevention processing. The stop prevention processing refers to performing facsimile transmission stop processing or preventing the input itself of a stop instruction. In this example, the screen under FAX transmission in FIG. 6A is displayed, and processing (FIG. 6B) in which facsimile transmission is not stopped even if a stop button is pressed is performed as the stop prevention processing.

In step S114, the controller 101 continues the facsimile transmission. In step S115, the controller 101 determines whether or not the acquisition of the image data has ended. If the information indicating that the transmission of the image data has ended is received from the terminal apparatus 20 when the image data is received from the communication unit 102, the controller 101 determines that the acquisition of the image data has ended. When the acquisition of the image data has ended (step S115: YES), the controller 101 ends the facsimile transmission. When the acquisition of the image data has not ended (step S115: NO), the controller 101 continues the acquisition of the image data in step S116.

Through the above process, the stop prevention processing is performed when an instruction for facsimile transmission is given from the terminal apparatus 20. That is, while facsimile transmission from the terminal apparatus 20 is being performed, the facsimile transmission is not stopped even if the user operates the image forming apparatus 10. In addition, even if the stop prevention processing is performed, the user of the terminal apparatus 20 may operate the input unit 205 to stop the facsimile transmission.

Second Exemplary Embodiment

Figure 7:
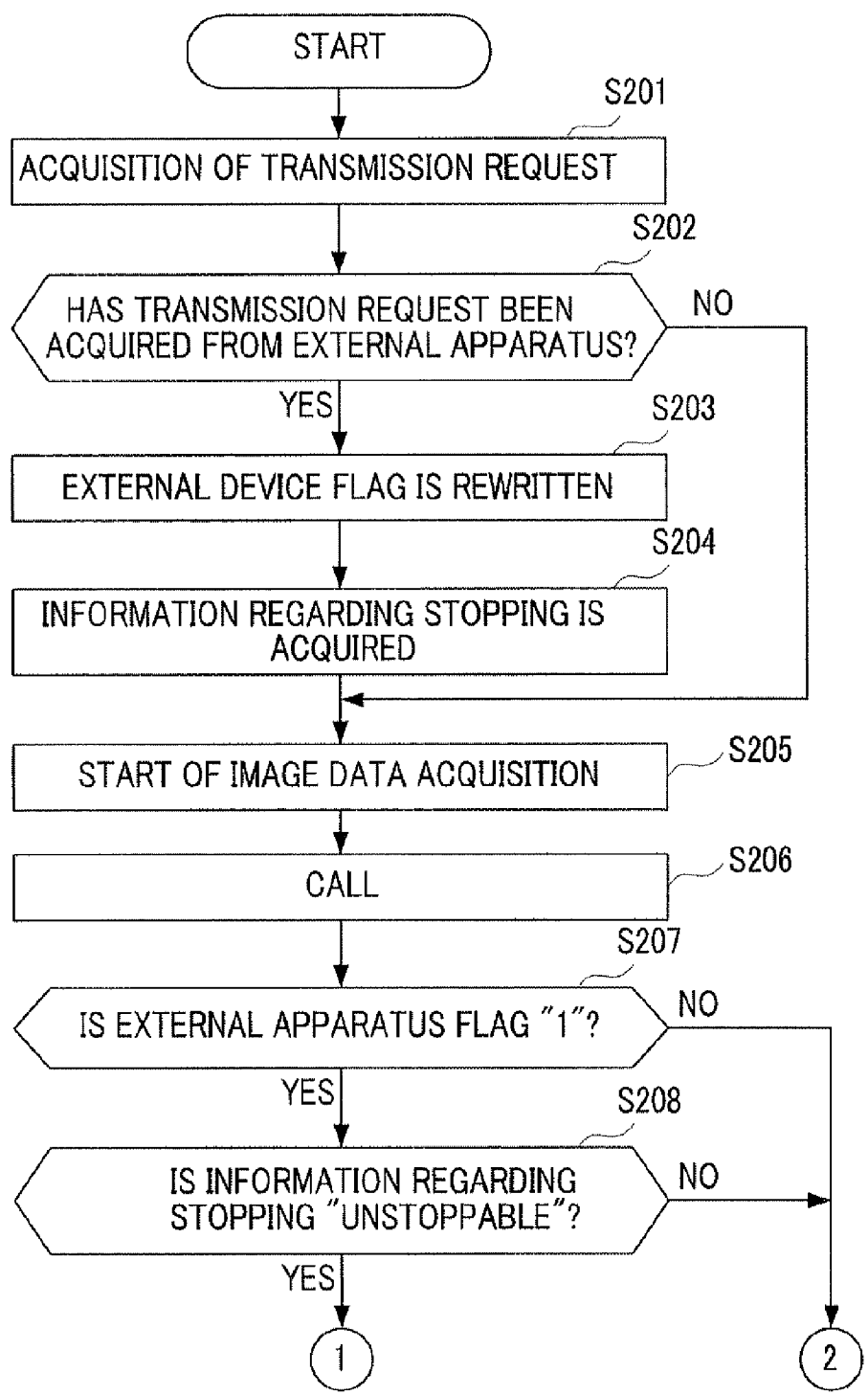
FIG. 7 is a flow chart showing processing according to a second exemplary embodiment.

FIG. 7 is a flowchart showing the processing according to a second exemplary embodiment of the invention which is executed in the image forming apparatus 10. The second exemplary embodiment is different from the first exemplary embodiment in that stop prevention processing is controlled on the basis of information regarding the stopping that the image forming apparatus 10 acquires from the terminal apparatus 20. The information regarding the stopping is information indicating whether or not to process a stop instruction as a valid instruction, in other words, information indicating whether or not to perform stop prevention processing when a facsimile transmission stop instruction is input from the image forming apparatus 10 while the image forming apparatus 10 is performing facsimile transmission of the image data acquired from the terminal apparatus 20. When the information regarding the stopping is "stoppable", the stop instruction is processed as a valid instruction (that is, stop prevention processing is not performed). When the information regarding the stopping is "unstoppable", the stop prevention processing is performed. When performing facsimile transmission by operating the terminal apparatus 20, the user inputs the information regarding the stopping through the input unit 205.

In step S201, the controller 101 acquires a transmission request. In step S202, the controller 101 determines whether or not the transmission request has been acquired from an external apparatus. When it is determined that the transmission request has been acquired from the external apparatus (step S202: YES), the controller 101 proceeds to step S203. When it is determined that the transmission request has not been acquired from the external apparatus (step S202: NO), the controller 101 proceeds to step S205.

In step S203, the controller 101 rewrites the value of the external apparatus flag from "0" to "1". In step S204, the controller 101 acquires the information regarding the stopping. The controller 101 receives the information regarding the stopping, which is input from the terminal apparatus 20, through the communication unit 102. The controller 101 adds the information regarding the stopping acquired in step S204 to data of information regarding the stopping stored in the RAM. The data of information regarding the stopping refers to data including plural items of information regarding the stopping.

FIG. 8 is a view showing an example of the data of information regarding the stopping. The data of information regarding the stopping includes information regarding a receiving number, a source of data acquisition, a transmission destination, and whether or not to stop the transmission. The receiving number is a number for identifying an instruction of facsimile transmission. The source of data acquisition indicates a device operated to instruct the facsimile transmission, that is, a transmission source of image data. If the source of data acquisition is an "external apparatus", this means that an instruction of facsimile transmission is given from the terminal apparatus 20. If the source of data acquisition is a "host device", this means that the image forming apparatus 10 is directly operated to give an instruction of facsimile transmission. The transmission destination indicates a transmission destination number. Whether or not to stop the transmission indicates the information regarding the stopping. The data of information regarding the stopping is stored while the acquisition or facsimile transmission of image data is being performed.

FIG. 7 is referred to again. In step S205, the controller 101 starts the acquisition of the image data. In step S206, the communication unit 102 calls the transmission destination number included in the acquired transmission request for connection with the image forming apparatus 30. The communication unit 102 performs facsimile transmission for the connected image forming apparatus 30. In step S207, the controller 101 determines whether or not the value of the external apparatus flag is "1". When it is determined that the value of the external apparatus flag is not "1" (step S207: NO), the controller 101 performs processing from 2 in the flow of FIG. 5. When it is determined that the value of the external apparatus flag is "1" (step S207: YES), the controller 101 proceeds to step S208.

In step S208, the controller 101 determines whether or not the information regarding the stopping is "unstoppable". The controller 101 reads the information regarding the stopping corresponding to the number of the facsimile transmission destination from the data of information regarding the stopping stored in the RAM. The controller 101 determines whether or not the read information regarding the stopping is "unstoppable". When it is determined that the information regarding the stopping is "unstoppable" (step S208: YES), the controller 101 performs processing from 1 in the flow of FIG. 5. When it is determined that the information regarding the stopping is not "unstoppable" (step S208: NO), the controller 101 performs processing from 2 in the flow of FIG. 5.

Third Exemplary Embodiment

Figure 9:
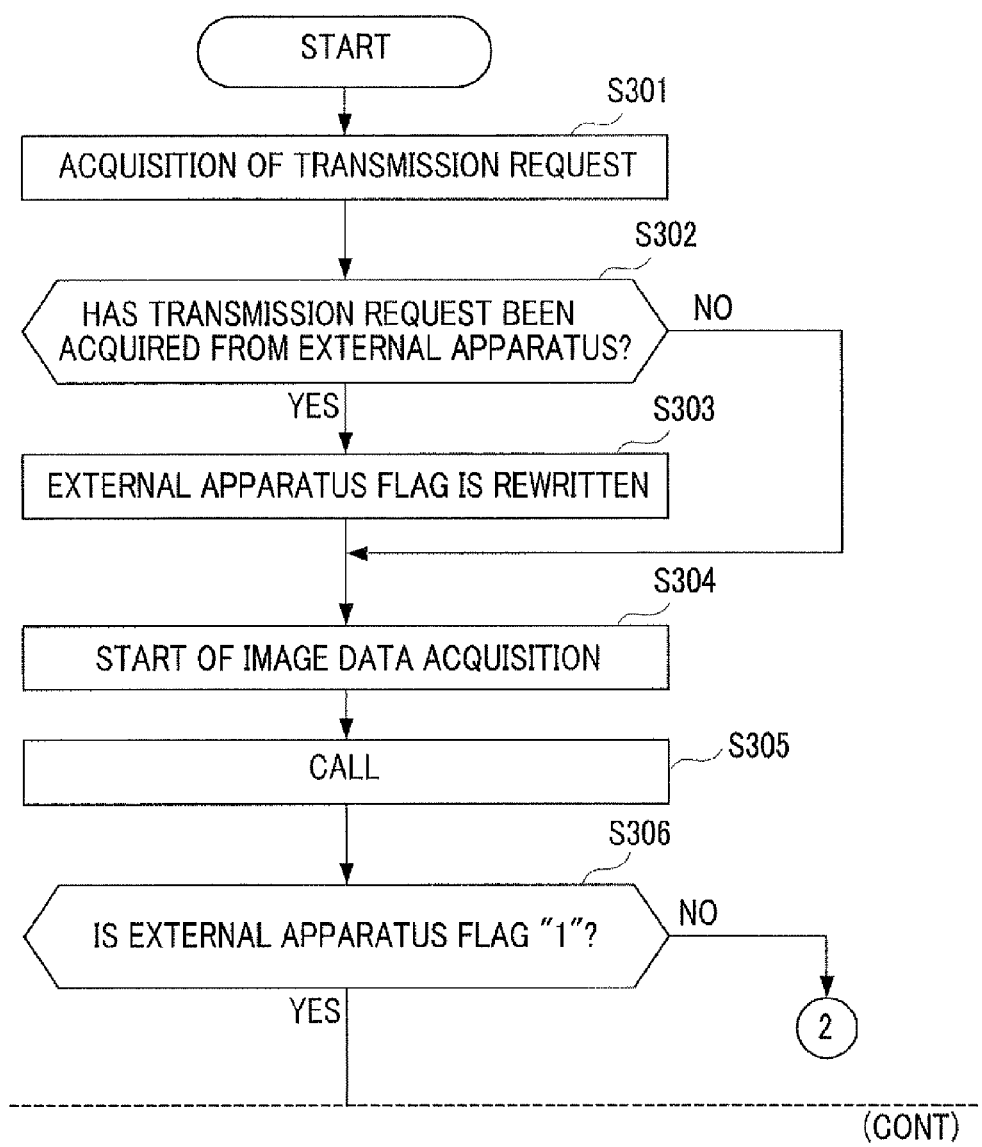
FIG. 9 is a flow chart showing processing according to a third exemplary embodiment.

FIG. 9 is a flow chart showing the processing according to a third exemplary embodiment of the invention which is executed in the image forming apparatus 10. The third exemplary embodiment is different from the first exemplary embodiment in that the image forming apparatus 10 transmits a stop confirmation request to the terminal apparatus 20 when a stop button is pressed and acquires the information regarding the stopping from the terminal apparatus 20.

In steps S301 to S305, the controller 101 performs the same processing as in steps S101 to S105 in the first exemplary embodiment in order to perform facsimile transmission. In step S306, the controller 101 determines whether or not the value of the external apparatus flag is "1". When it is determined that the value of the external apparatus flag is not "1" (step S306: NO); the controller 101 performs processing from 2 in the flow of FIG. 5. When it is determined that the value of the external apparatus flag is "1" (step S306: YES), the controller 101 proceeds to step S307.

In step S307, the display 104 displays the screen under FAX transmission (see FIG. 6A). In step S308, the controller 101 determines whether or not the stop button has been pressed. When the stop button is pressed (step S308: YES), the controller 101 proceeds to step S309. When the stop button is not pressed (step S308: NO), the controller 101 proceeds to step S312.

In step S309, the communication unit 102 transmits to the terminal apparatus 20 a stop confirmation request for confirming whether or not to perform facsimile transmission stop processing.

Figure 10:
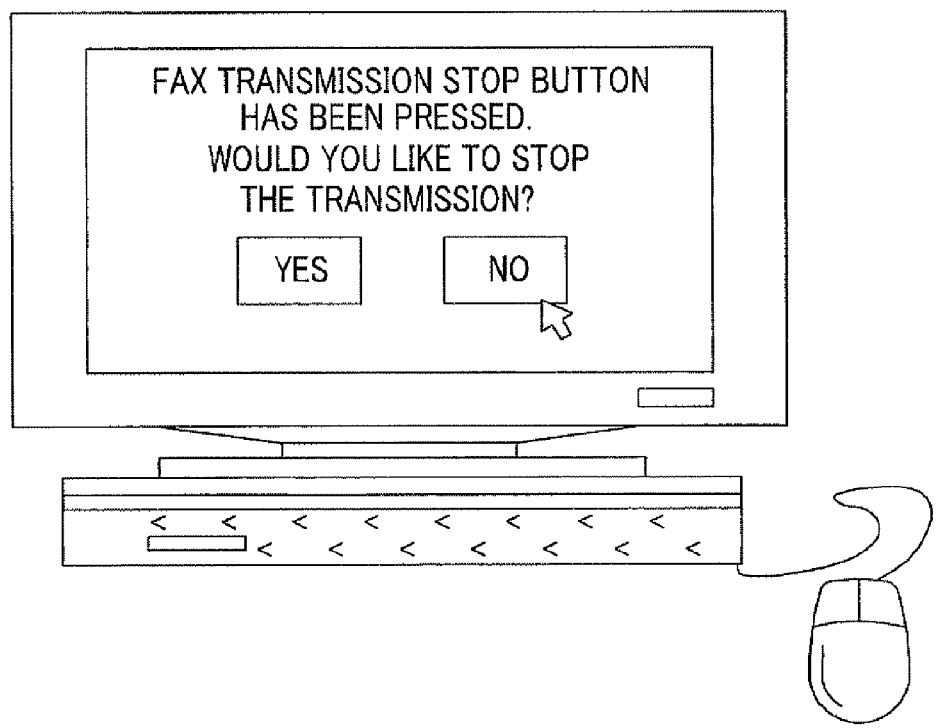
FIG. 10 is a view showing an example of a stop confirmation screen.

FIG. 10 is a view showing an example of a stop confirmation screen displayed on the display 204 of the terminal apparatus 20. When a stop confirmation request is received, the controller 201 of the terminal apparatus 20 displays the screen of FIG. 10 on the display 204. The user of the terminal apparatus 20 clicks "YES" or "NO" on the stop confirmation screen and as a result, the information regarding the stopping is transmitted to the image forming apparatus 10. If "NO" on the stop confirmation screen is clicked, the information regarding the stopping which indicates that the facsimile transmission is not stoppable is transmitted. If "YES" on the stop confirmation screen is clicked, the information regarding the stopping which indicates that the facsimile transmission is stoppable is transmitted.

FIG. 9 is referred to again. In step S310, the communication unit 102 receives the information regarding the stopping from the terminal apparatus 20. In step S311, the controller 101 determines whether or not the information regarding the stopping is "unstoppable". When it is determined that the information regarding the stopping is "unstoppable" (step S311: YES), the controller 101 performs processing from 1 in the flow of FIG. 5. When it is determined that the information regarding the stopping is "stoppable" (step S311: NO), the controller 101 performs facsimile transmission stop processing in step S109. If the information regarding the stopping is not transmitted from the terminal apparatus 20, an operation set in advance is performed. For example, if the image forming apparatus 10 does not receive the information regarding the stopping within a time set in advance after a stop confirmation request is transmitted, the controller 101 determines that the information regarding the stopping is "stoppable" and performs the facsimile transmission stop processing.

In step S312, the controller 101 continues the facsimile transmission. In steps S313 and S314, the controller 101 performs the same processing as in steps S115 to S116 in the first exemplary embodiment and ends the facsimile transmission.

Fourth Exemplary Embodiment

Figure 11:
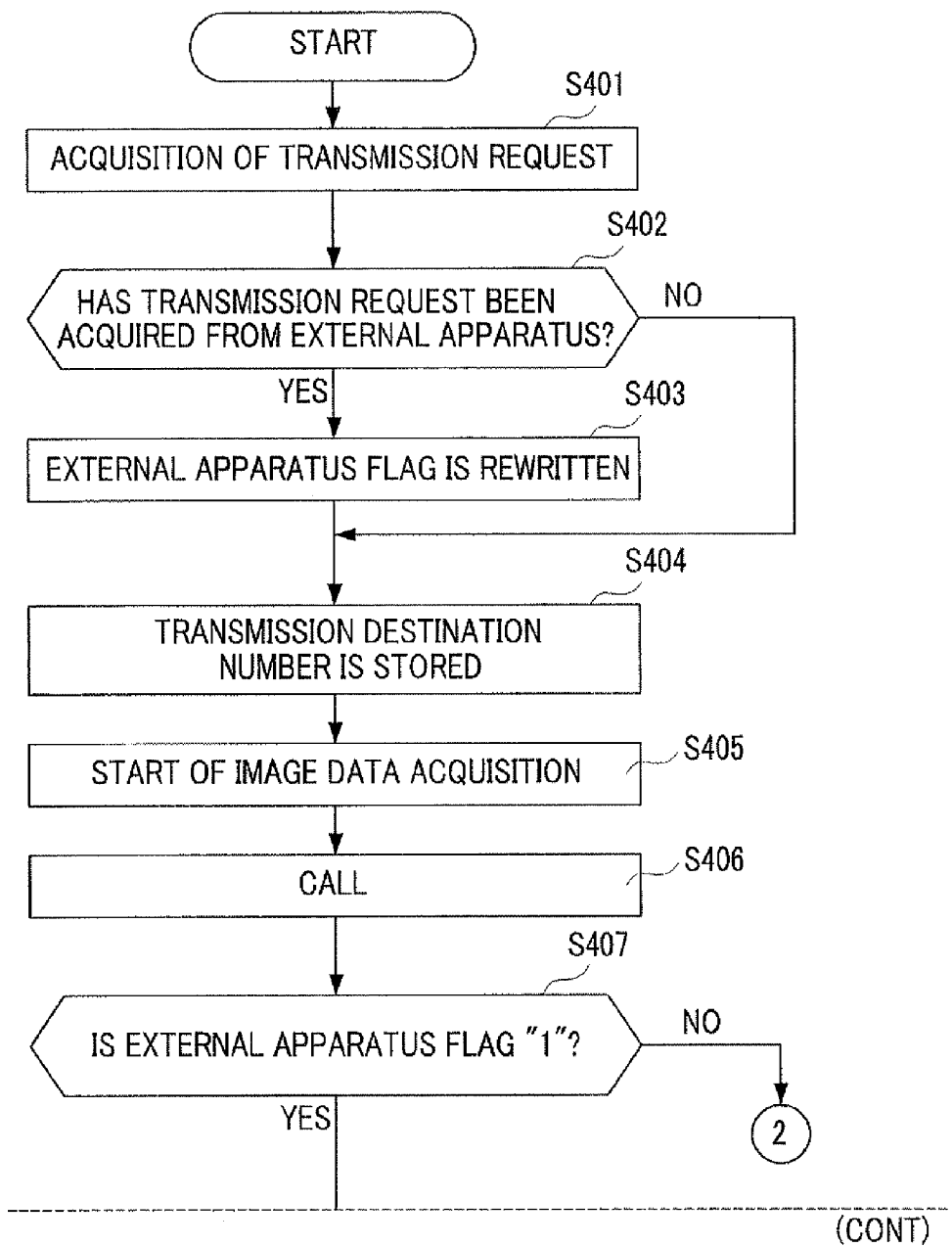
FIG. 11 is a flow chart showing processing according to a fourth exemplary embodiment.

FIG. 11 is a flow chart showing the processing according to a fourth exemplary embodiment of the invention which is executed in the image forming apparatus 10. The fourth exemplary embodiment is different from the first exemplary embodiment in that stop prevention processing is controlled on the basis of authentication information of a user of the terminal apparatus 20 and authentication information of a user who presses a stop button. The authentication information of users of plural terminal apparatuses 20 in the image transmission system 1 is stored in advance in the memory 103 of the image forming apparatus 10.

In steps S401 to S403, the controller 101 performs the same processing as in steps S301 to S303 in the third exemplary embodiment. In step S404, the controller 101 stores the transmission destination number, which is included in the transmission request acquired in step S401, in the RAM so as to correspond to the authentication information of the user of the terminal apparatus 20 that is a transmission source of image data. In this example, the terminal apparatus 20 transmits the transmission request including the user identification information to the image forming apparatus 10. The controller 101 specifies the authentication information of the user of the terminal apparatus 20, which is a transmission source of image data, from the plural authentication information items on the basis of the identification information included in the transmitted transmission request. The transmission destination number is stored while the acquisition or facsimile transmission of image data is being performed. The image forming apparatus 10 may not be stored in the user authentication information in advance. In this example, the terminal apparatus 20 transmits the transmission request including the user authentication information to the image forming apparatus.

The controller 101 stores a set of the transmission destination number and the authentication information, which are included in the transmission request acquired from the terminal apparatus 20, in the memory 103.

FIG. 12 is a view showing an example of data showing a transmission destination number and authentication information of a user of the terminal apparatus 20. This example shows that the authentication information of a user of the terminal apparatus 20, who instructs facsimile transmission to a transmission destination number "XXX-XXXX" is "OOO". Since facsimile transmission to a transmission destination number "YYY-YYYY" is instructed by operating the image forming apparatus 10 directly, the authentication information is not stored.

FIG. 11 is referred to again. In steps S405 to S408, the controller 101 performs the same processing as in steps S304 to S307 in the third exemplary embodiment. In step S409, the controller 101 determines whether or not a stop button has been pressed. When the stop button is pressed (step S409: YES), the controller 101 proceeds to step S410. When the stop button is not pressed (step S409: NO), the controller 101 proceeds to step S412.

In step S410, the controller 101 acquires the authentication information of the user who presses the stop button. The acquisition of the authentication information is performed by a method using an IC (Integrated Circuit) card or a method of operating the input unit 105, for example. When an IC card is used, the image forming apparatus 10 includes an IC card reader. The user may carry an IC card on which his or her authentication information is recorded. The user who is going to operate the image forming apparatus 10 makes the IC card reader read the authentication information recorded on the IC card. When the input unit 105 is used, the user operates the input unit 105 to input his or her authentication information (an ID or a password). The authentication information may be acquired before the stop button is pressed in step S409. In step S411, the controller 101 determines whether or not the authentication information of the user who presses the stop button matches the authentication information of the user of the terminal apparatus 20 stored in the RAM. "Matching of authentication information items" referred to herein is not limited to the case where the authentication information items completely match each other, and parts of the authentication information items may match each other. In addition, the image forming apparatus 10 may perform operations using the authentication information of the user who presses the stop button and the authentication information of the user of the terminal apparatus 20 stored in the RAM, and it may be determined that the authentication information items match each other when a difference between both operation results satisfies predetermined conditions. The controller 101 acquires the authentication information of the user of the terminal apparatus 20 on the basis of the transmission destination number for which facsimile transmission is performed. When it is determined that the authentication information items match each other (step S411: YES), the controller 101 performs facsimile transmission stop processing in step S109. When it is determined that the authentication information items do not match each other (step S411: NO), the controller 101 performs processing from 1 in the flow of FIG. 5.

In step S412, the controller 101 continues the facsimile transmission. In steps S413 and S414, the controller 101 performs the same processing as in steps S115 to S116 in the first exemplary embodiment and ends the facsimile transmission.

The present invention is not limited to the above-described exemplary embodiments, and various modifications may be made. Hereinafter, some modifications will be described. Two or more modifications described below may also be used in combination.

(1) First Modification

Figure 6B:
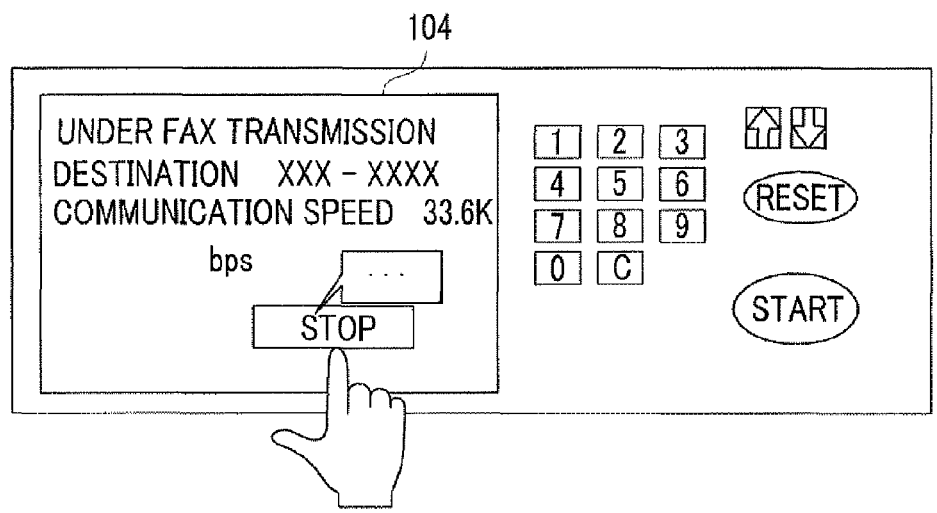
Figure 6C:
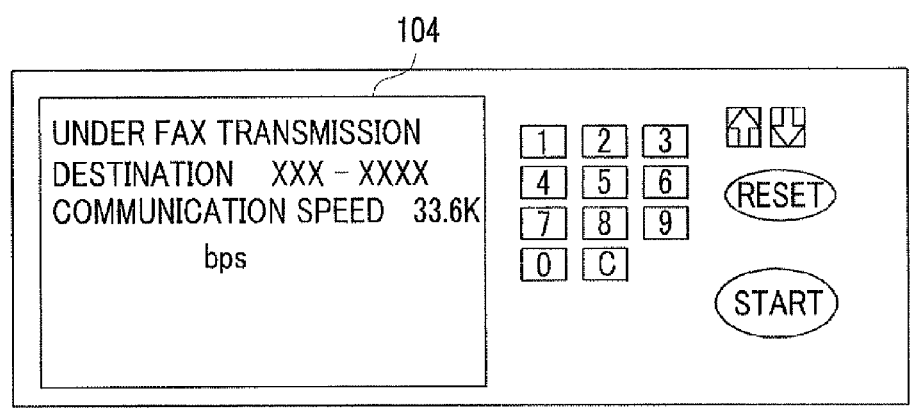
Figure 6D:
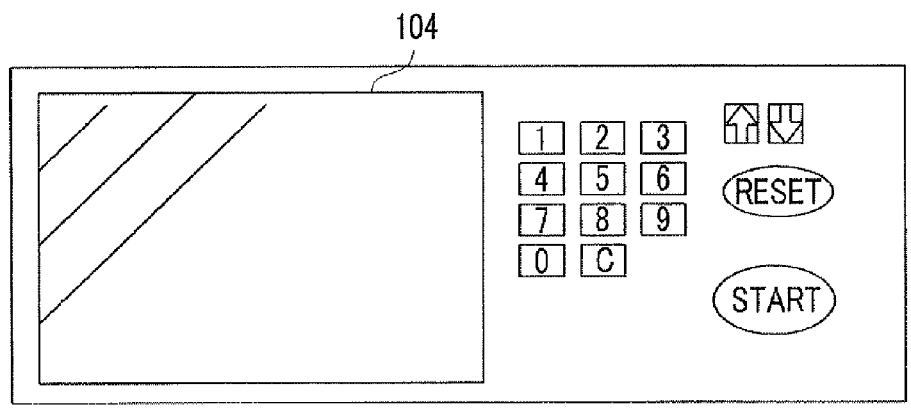

The stop prevention processing is not limited to the mode shown in FIG. 6B described in the exemplary embodiment. For example, in the first and second exemplary embodiments, the stop prevention processing may also be performed by processing of displaying a screen under FAX transmission not including a stop button (FIG. 6C) or processing of not displaying the screen under FAX transmission itself (FIG. 6D). As another example, when the input unit 105 has a stop button as hardware and the controller 101 performs stop processing when the stop button is pressed by the user, the controller 101 may perform processing of not stopping facsimile transmission, as stop prevention processing, even if the stop button is pressed.

(2) Second Modification

An image transmission apparatus (image forming apparatus in the exemplary embodiment) and an image receiving apparatus (image forming apparatus 30 in the exemplary embodiment) are not limited to the image forming apparatuses. The image transmission apparatus and the image receiving apparatus may not have a function (image forming unit 107) of forming an image. In this case, the image receiving apparatus displays an image on a display according to the received image data. As another example, the external communication line 50 is not limited to the telephone line. The external communication line may be the Internet, for example. In this case, the image transmission apparatus transmits the image data as a packet.

(3) Third Modification

In the processing of the image forming apparatus 10 according to the first to fourth exemplary embodiments, the case of performing facsimile transmission by calling in a state where the acquisition of image data continues (hereinafter, referred to as "real-time communication") has been performed as an example. The present invention is not limited to such a case of real-time communication, and may be applied to a case of performing facsimile transmission by calling after the acquisition of image data ends and an internal communication line is disconnected (hereinafter, referred to as "non-real-time communication"). In addition, when the image forming apparatus 10 is able to perform both the real-time communication and the non-real-time communication, the image forming apparatus 10 may control stop prevention processing according to whether it is real-time communication or non-real-time communication. For example, the image forming apparatus 10 may perform stop prevention processing only in the case of real-time communication.

(4) Fourth Modification

FIG. 13 is a view showing an example of setup information of the stop prevention processing in the third modification. In the third modification, the image forming apparatus 10 determines whether or not to perform the stop prevention processing according to the attribute of the terminal apparatus 20 that instructs facsimile transmission. In this case, the terminal apparatus 20 transmits its own attribution information to the image forming apparatus 10 together with a facsimile transmission instruction. In this example, a department of a user of the terminal apparatus 20 is used as the attribute of the terminal apparatus 20. In the example shown in FIG. 13, stop prevention setting is set as "possible" for the terminal apparatuses 20 whose attributes are "general affairs" and "accounting". In addition, the stop prevention setting is set as "not possible" for the terminal apparatuses whose attribute is "legal". When the image data is transmitted from the terminal apparatus 20 corresponding to the attribute "general affairs" or "accounting", the image forming apparatus 10 performs stop prevention processing. On the other hand, when the image data is transmitted from the terminal apparatus 20 corresponding to the attribute "legal", the image forming apparatus 10 does not perform stop prevention processing. As the attributes, information other than the department, such as a user name or office organization, may also be used, for example. As another example, the image forming apparatus 10 may have setup information for controlling whether or not to perform stop prevention processing as batch processing. In this case, an attribute to which control of the stop prevention processing performed as batch processing is not applied exceptionally may be set.

(5) Fifth Modification

In the first to fourth exemplary embodiments, when the stop prevention processing is performed in the mode shown in FIG. 6B, the display 104 may notify a user who presses a stop button that facsimile transmission stop processing is not possible. For example, this notification is performed by displaying a message showing the point or by generating a sound.

(6) Sixth Modification

In the first to fourth exemplary embodiments, the information included in the transmission request is not limited to the information indicating an instruction of facsimile transmission and the identification information of the transmission destination number and a user. For example, the transmission request acquired from the terminal apparatus 20 may include image data. In this case, the image forming apparatus 10 starts the acquisition of image data at a timing at which the transmission request is acquired. As another example, a transmission destination number may not be included in a transmission request. In this case, the image forming apparatus 10 acquires the transmission destination number separately from the transmission request.

(7) Seventh Modification

In the case where both the external apparatus flag and the information regarding the stopping are used, it is not limited to the examples described in the exemplary embodiments to which information priority is given when determining whether or not to perform stop prevention processing. For example, in the second exemplary embodiment (FIG. 7), an example where priority is given to the information regarding the stopping over the external apparatus flag has been described. The image forming apparatus 10 may operate either in a first operation mode, in which priority is given to the external apparatus flag, and a second operation mode, in which priority is given to the information regarding the stopping. Switching between the first and second operation modes is performed by a user instruction, for example. As another example, switching between the first and second operation modes may be performed on the basis of the attribute of the terminal apparatus 20.

(8) Eighth Modification

A program executed by the image forming apparatus 10, the terminal apparatus 20, or the image forming apparatus 30 in the exemplary embodiments may be provided in a state stored in computer readable media, such as magnetic storage media (for example, a magnetic tape, a magnetic disk (HDD and FD (Flexible Disk)), optical storage media (for example, an optical disc (CD (Compact Disc) and DVD (Digital Versatile Disc)), magneto-optical storage media, and a semiconductor memory (for example, flash ROM). In addition, this program may be downloaded through a network, such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image transmission apparatus comprising:
   an acquisition unit that acquires image data and an identifier for identifying a transmission destination;
   a first transmission unit that transmits the image data to a transmission destination identified by the identifier;
   a receiving unit that receives a stop instruction for stopping the transmission while the first transmission unit is transmitting the image data; and
   a processing unit that when a transmission request of the image data is received from a host apparatus, operates in a first mode to perform stop processing for stopping the transmission when the receiving unit receives the stop instruction, and when the transmission request of the image data is received from an external apparatus, operates in a second mode to perform stop prevention processing for preventing the stop processing from being performed or the stop instruction from being received.

2. The image transmission apparatus according to claim 1, wherein the acquisition unit acquires information regarding stopping that indicates whether or not to perform the stop prevention processing, and
   the processing unit performs the stop prevention processing according to the information regarding stopping when the transmission request of the image data is received from an external apparatus.

3. The image transmission apparatus according to claim 2, wherein the receiving unit displays an image for receiving the stop instruction while the transmission is being performed, and the processing unit performs, as the stop prevention processing, processing of not displaying the image while the transmission is being performed.

4. The image transmission apparatus according to claim 2, wherein the receiving unit displays an image, which shows that the transmission is being performed while the transmission is being performed, in a state including an image for receiving the stop instruction, and the processing unit performs, as the stop prevention processing, processing of not displaying the image showing that the transmission is being performed while the transmission is being performed.

5. The image transmission apparatus according to claim 2, wherein the receiving unit has an operator that outputs a signal indicating the stop instruction according to a user's operation, and the processing unit does not perform the stop processing even if the signal is output from the operator as the stop prevention processing.

6. The image transmission apparatus according to claim 2, wherein the processing unit performs the stop prevention processing when the first transmission unit is transmitting image data in a state where acquisition of image data by the acquisition unit continues.

7. The image transmission apparatus according to claim 1, wherein the receiving unit displays an image for receiving the stop instruction while the transmission is being performed, and the processing unit performs, as the stop prevention processing, processing of not displaying the image while the transmission is being performed.

8. The image transmission apparatus according to claim 1, wherein the receiving unit displays an image, which shows that the transmission is being performed while the transmission is being performed, in a state including an image for receiving the stop instruction, and the processing unit performs, as the stop prevention processing, processing of not displaying the image showing that the transmission is being performed while the transmission is being performed.

9. The image transmission apparatus according to claim 1, wherein when the transmission request of the image data is received from an external apparatus, the first transmission unit transmits to the external apparatus a stop confirmation request for confirming whether or not to perform the stop processing when the receiving unit receives the stop instruction, the acquisition unit acquires information regarding stopping, which is a response to the stop confirmation request and indicates whether or not to perform the stop prevention processing, from the external apparatus, and the processing unit performs the stop prevention processing according to the information regarding stopping acquired by the acquisition unit.

10. The image transmission apparatus according to claim 9, wherein the receiving unit has an operator that outputs a signal indicating the stop instruction according to a user's operation, and the processing unit does not perform the stop processing even if the signal is output from the operator as the stop prevention processing.

11. The image transmission apparatus according to claim 1, wherein first authentication information used for user authentication is stored in a memory, the acquisition unit acquires second authentication information of a user who operates the image transmission apparatus, and the processing unit performs the stop prevention processing according to the first authentication information and the second authentication information when the transmission request of the image data is received from an external apparatus.

12. The image transmission apparatus according to claim 11, wherein the receiving unit has an operator that outputs a signal indicating the stop instruction according to a user's operation, and the processing unit does not perform the stop processing even if the signal is output from the operator as the stop prevention processing.

13. The image transmission apparatus according to claim 1, wherein the receiving unit has an operator that outputs a signal indicating the stop instruction according to a user's operation, and the processing unit does not perform the stop processing even if the signal is output from the operator as the stop prevention processing.

14. The image transmission apparatus according to claim 1, wherein the processing unit performs the stop prevention processing when the first transmission unit is transmitting image data in a state where acquisition of image data by the acquisition unit continues.

15. The image transmission apparatus according to claim 1, further comprising:

a memory that stores setup information indicating that the stop prevention processing is valid or invalid, wherein the processing unit performs the stop prevention processing according to the setup information stored in the memory when the transmission request of the image data is received from an external apparatus.

16. The image transmission apparatus according to claim 1, further comprising:

a memory that stores a flag indicating whether or not the transmission request of the image data has been received from an external apparatus, wherein the processing unit determines whether or not the transmission request of the image data has been received from an external apparatus on the basis of the flag stored in the memory.

17. The image transmission apparatus according to claim 1, further comprising:

an image data generating unit that reads a document to generate image data, wherein the processing unit performs the stop processing when the image data generated by the image data generating unit is acquired by the acquisition unit.

18. The image transmission apparatus according to claim 1, further comprising:

an input unit which receive a user operation, wherein the receiving unit receives a stop instruction through the input unit.

19. An image transmission system comprising:
the image transmission apparatus according to claim 1;
an information terminal including a second transmission unit that transmits the identifier and the image data to the image transmission apparatus; and
an image receiving apparatus including a receiving unit that receives the image data transmitted by the image transmission apparatus.

20. A non-transitory computer readable medium that stores a program causing a computer including a controller, a communication unit, and a receiving unit to execute:
acquiring image data and an identifier for identifying a transmission destination;
transmitting the image data to a transmission destination identified by the identifier;
receiving a stop instruction for stopping the transmission while the image data is being transmitted; and
when a transmission request of the image data is received from a host apparatus, operating in a first mode to perform stop processing for stopping the transmission when the stop instruction is received, and when the transmission request of the image data is received from an external apparatus, operating in a second mode to perform stop prevention processing for preventing the stop processing from being performed or the stop instruction from being received.

21. An image transmission method comprising:
acquiring image data and an identifier for identifying a transmission destination;
transmitting the image data to a transmission destination identified by the identifier;
receiving a stop instruction for stopping the transmission while the image data is being transmitted; and
when a transmission request of the image data is received from a host apparatus, operating in a first mode to perform stop processing for stopping the transmission when the stop instruction is received, and when the transmission request of the image data is received from an external apparatus, operating in a second mode to perform stop prevention processing for preventing the stop processing from being performed or the stop instruction from being received.

* * * * *